(12) United States Patent
Petrovic

(10) Patent No.: US 9,251,683 B2
(45) Date of Patent: Feb. 2, 2016

(54) FLAME DETECTOR USING A LIGHT GUIDE FOR OPTICAL SENSING

(75) Inventor: Dragan Petrovic, Geneva, IL (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 983 days.

(21) Appl. No.: 13/235,057

(22) Filed: Sep. 16, 2011

(65) Prior Publication Data

US 2013/0068933 A1 Mar. 21, 2013

(51) Int. Cl.

| G01J 5/02 | (2006.01) |
|---|---|
| G01J 1/42 | (2006.01) |
| G01J 1/04 | (2006.01) |
| G08B 17/12 | (2006.01) |
| G01J 5/00 | (2006.01) |
| G08B 29/04 | (2006.01) |
| G08B 17/10 | (2006.01) |
| G08B 29/18 | (2006.01) |

(52) U.S. Cl.
CPC ............... *G08B 17/12* (2013.01); *G01J 5/0014* (2013.01); *G08B 29/043* (2013.01); *G08B 17/10* (2013.01); *G08B 29/183* (2013.01)

(58) Field of Classification Search
CPC ...... G08B 17/12; G08B 17/125; G08B 19/00; G08B 19/005; G08B 21/00; G08B 25/00; G08B 25/006; G08B 29/043; G08B 29/145; G08B 17/00; G08B 17/06; G08B 17/10; G08B 17/103; G08B 17/107; G08B 17/11; G01J 5/0014; G01J 5/0018
USPC ............ 250/208.2, 339.14, 339.15, 554, 216, 250/227.11, 227.2, 227.21, 227.24; 340/577, 578
See application file for complete search history.

(56) References Cited

U.S. PATENT DOCUMENTS

| 3,088,037 | A | | 4/1963 | Baum |
|---|---|---|---|---|
| 3,739,364 | A | | 6/1973 | Müller |
| 3,742,474 | A | | 6/1973 | Muller |
| 3,940,753 | A | | 2/1976 | Müller |
| 4,405,919 | A | | 9/1983 | Scheidweiler |
| 4,855,718 | A | | 8/1989 | Cholin et al. |
| 5,005,003 | A | | 4/1991 | Ryser et al. |
| 5,384,467 | A | * | 1/1995 | Plimon et al. ................. 250/554 |
| 5,594,421 | A | | 1/1997 | Thuillard |
| 6,111,511 | A | | 8/2000 | Sivahanu et al. |
| 6,127,932 | A | * | 10/2000 | Wilson et al. ................. 340/578 |
| 6,967,582 | B2 | | 11/2005 | Tice et al. |

(Continued)

FOREIGN PATENT DOCUMENTS

| EP | 0 337 409 A2 | 10/1989 |
|---|---|---|
| EP | 1 708 149 A2 | 10/2006 |

OTHER PUBLICATIONS

Osram, Silicon Pin Photodiode with Daylight Filter, BP 104 FAS and BP 104 FASR, Apr. 18, 2007, pp. 1-6, Opto Semiconductors GmbH, Wernerwerkstrasse 2, D-93049 Regensburg.

Osram, Silicon Pin Photodiode with Daylight Filter; in SMT, BP 104 F and BP 104 FS, Apr. 7, 2009, pp. 1-7, Opto Semiconductors GmbH, Wernerwerkstrasse 2, D-93049 Regensburg.

(Continued)

*Primary Examiner* — Pascal M Bui Pho
(74) *Attorney, Agent, or Firm* — Husch Blackwell LLP

(57) ABSTRACT

A multi-sensor fire detector includes first and second flame sensors which are coupled to an external environment by a rigid, tapered, optical coupling element. An external end of the coupling element has a cured hemispherical shape with a viewing angle approaching one hundred eighty degrees. Processing and control circuits coupled to the sensors make a determination as to the presence of a fire condition.

13 Claims, 3 Drawing Sheets

(56) References Cited

U.S. PATENT DOCUMENTS

| | | |
|---|---|---|
| 7,068,177 B2 | 6/2006 | Tice |
| 7,551,096 B2 | 6/2009 | Tice |
| 7,602,304 B2 | 10/2009 | Tice |
| 8,153,952 B2 * | 4/2012 | Haffner ............... 250/208.2 |
| 2013/0068933 A1 * | 3/2013 | Petrovic ............... 250/208.2 |

OTHER PUBLICATIONS

European Search Report, dated Sep. 16, 2013, corresponding to Application No. EP 12 18 4504.

* cited by examiner

FLAME DETECTOR USING A LIGHT GUIDE FOR OPTICAL SENSING

FIELD

The application pertains to fire detectors which incorporate multiple different sensors. More particularly, the application pertains to such detectors which include multiple optical sensors and associated filters to optically sense ambient flames at two different frequencies.

BACKGROUND

It has been recognized that the use of multiple different types of fire-indicating sensors can be useful in making determinations as to the presence of a fire condition. Various multi-sensor types of fire detectors are known. These include, for example those disclosed in U.S. Pat. No. 6,967,582 entitled "Detector with Ambient Photon Sensor and Other Sensors", U.S. Pat. No. 7,068,177 entitled "Multi-sensor Device and Methods for Fire Detection", U.S. Pat. No. 7,551,096 entitled "Multi-sensor Device and Methods for Fire Detection" and U.S. Pat. No. 7,602,304 entitled "Multi-sensor Device and Methods for Fire Detection". The noted patents are all assigned to the assignee hereof and incorporated herein by reference.

Existing products using the concepts and ideas from these patents show that optical flame detection is an important part of the multi-sensor fire detection. However, the process of sensing flames in such existing products does not allow for an easy determination of whether the light originates from a flame or it has some other, benign origin. Known detectors often just detect the presence of light in the near infrared portion of the optical spectrum.

There is a need to address several factors that make use of the optical signals difficult. For example, in some instances, temporal patterns of the optical signals, taken every five seconds (or at most every second), represent the only information available to be used to make determination whether a change in the signal is due to flames or not. Additional, normal ambient environments often produce signals in the infrared without flames being present (light bulbs, sunlight, etc.) Consequently, whenever the signal processing does not have sufficient information, it will usually conservatively declare that the observed signal increase is due to flames. This potentially leads to increased frequency of nuisance alarms.

Multi-sensor detectors can limit use of information pertaining to flames to circumstances where the other types of sensors indicate that a fire is developing. There are situations when dangerous flaming fires could be detected more quickly if flame related signals could be regarded as reliable indicators of a fire condition as is the case with other types of fire indicators. For instance a cleanly burning alcohol fire can produce substantial flames but very little smoke and minor temperature rise.

Presently, signals indicating the presence of flame may be dismissed, or given limited weight, because other fire indicators such as smoke and temperature are not significant enough to determine that a fire is developing or present in a region. More reliable flame detection could speed detection of flaming fires.

DETAILED DESCRIPTION

Figure 1:
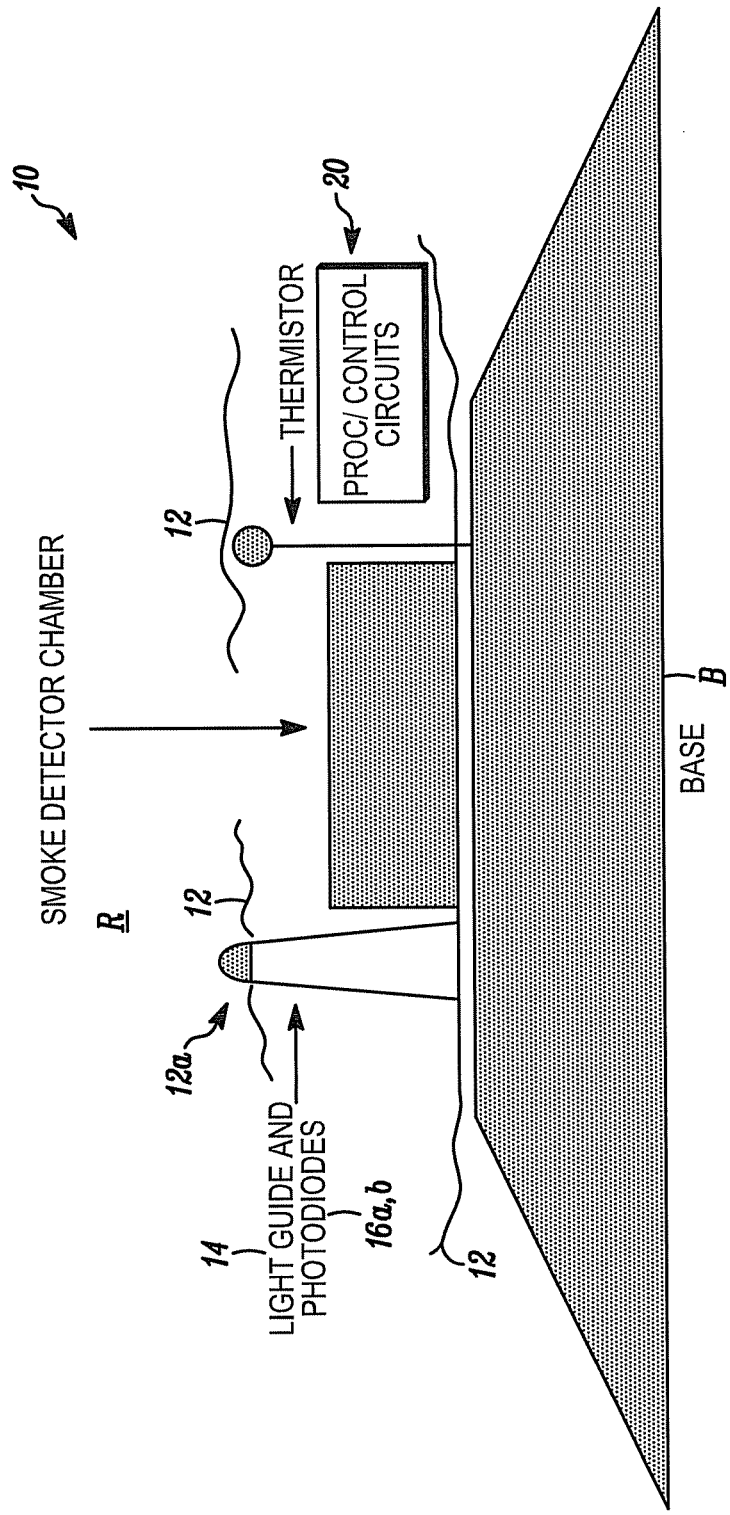
FIG. 1 is an overall diagram of a detector illustrating aspects of an embodiment hereof.

While disclosed embodiments can take many different forms, specific embodiments hereof are shown in the drawings and will be described herein in detail with the understanding that the present disclosure is to be considered as an exemplification of the principles hereof, as well as the best mode of practicing same, and is not intended to limit the claims hereof to the specific embodiment illustrated.

In a disclosed embodiment, multiple characteristics of flaming conditions can be processed in arriving at a fire determination. Two properties of flames are of interest here: flicker and color (temperature) of flames.

It is well-established fact that light emitted by flickering flames changes intensity with a frequency of oscillations generally below 20 Hz. If a flame sensor indicates that a detected signal has a substantial frequency content in that frequency range then the probability of having a signal that was produced by flames is much higher than if this is not the case. It is also well known that most flames have a similar appearance, a familiar, flickering orange-yellowish color. This appearance comes from the soot particles that are being formed in flames. Hotter parts of the flame appear to be more yellowish-white and cooler parts appear more reddish.

Soot particles generally behave as block bodies in the way they emit light. Those of skill in the art understand that if the emission spectrum of a flame is coming from a black body at some elevated temperature, it is possible to compute that temperature if light intensity at two wavelengths is measured.

Flame temperature changes in the course of time but the average value of the ratio of light intensities is correlated to the average temperature of the flame. Indeed, experiments indicate that ratio of the IR signals with slightly different bandpass filters can be sorted out into two distinct groups. These are, signals coming from flames and signals coming from other sources.

In summary, most flames have similar orange-yellowish color and light intensity changes at frequencies below 20-30 Hz. If both of these conditions are observed simultaneously then one can judge fairly reliably whether the observed signal is due to flames or not. This information can then be used to improve the performance of fire detectors by evaluating data reflecting presence of smoke, temperature increase and flames on a more equal footing.

In one aspect hereof, two photodiodes that have slightly different IR bandpass filters can be used. Using two closely spaced wavelengths is advantageous because signal magnitudes from each can be expected to be similar.

Additionally, it is possible that the emissivity of a surface may change a great deal over a large wavelength span. Black soot is generally considered as nearly perfect black body. However, depending on the fuel and conditions during fire soot may incorporate other chemical constituents and the possibility of having unknown emissions would preclude the possibility of determining temperature from the ratio of intensities at two different wavelengths.

Having wavelengths closely spaced allows one to cancel the emissions at two wavelengths when taking the ratio of intensities and thusly evaluate temperature of the light source. Those of skill in the art will understand that both AC and DC processing of signals are options. Such variations come within the spirit and scope hereof.

Figure 2:
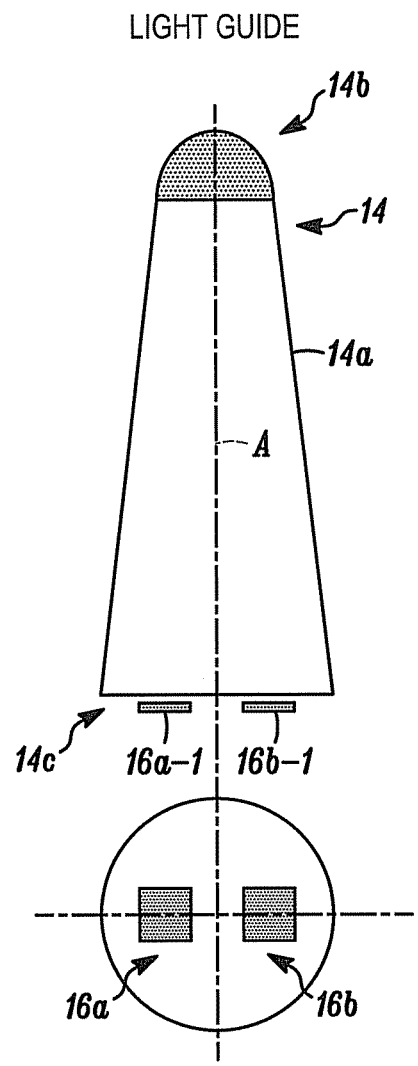
FIG. 2 is a diagram illustrating details of the detector of FIG. 1.
Figure 3:
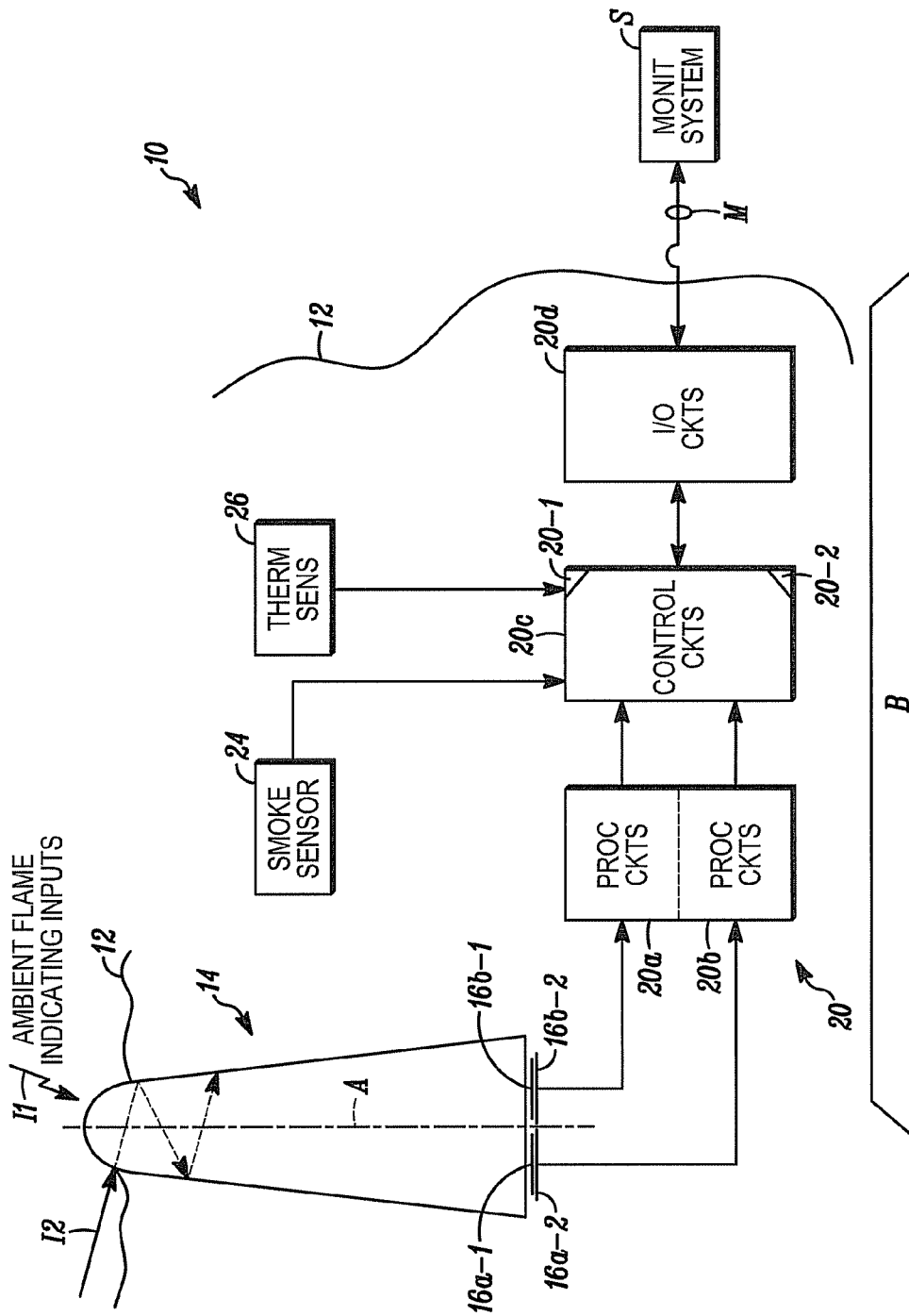
FIG. 3 is a block diagram illustrating additional aspects of the detector of FIG. 1.

FIGS. 1-3 illustrate aspects of an embodiment, detector 10, hereof. Detector 10 includes a housing 12 with flow ports for ambient airborne particulate matter, along with an optical input port generally indicated at 12a.

Ambient flame indicating radiant energy I1, I2, falls upon housing 12 in the event of a developing fire condition, best seen in FIG. 3, Incident flame indicting radiant energy is coupled via a tapered wave, or light guide 14 from the external optical input port 12a to first and second fire sensors generally indicated at 16a, 16b.

The light guide 14 has an elongated, tapered body portion 14a, an optical input end, generally hemispherical, 14b and a planar output end 14c. An elongated axis of symmetry A extends through the optical guide 14.

Housing 12 can be removable mounted on a base B which can in turn couple detector 10 via a wired or wireless medium M to a displaced monitoring system S. When installed on the base B the housing 12 of detector 10 extends toward a portion of a region R being monitored for various conditions. In this configuration. the only portion of the light guide 14 which is exposed to ambient light, from flames for example, is input end 14b.

The tapered body portion 14a, which couples incoming radiant energy signals to the sensors 16a, 16b is advantageous in that ratios of signals from the sensor assemblies 16a, 16b vary less with changing source location. Additionally, alignment tolerances need not be as tight as in the case of a cylindrical, non-tapered body portion. Further, smaller signal variations can be expected from the adjacent radiant energy source.

The sensor assemblies 16a, 16b each include an optical bandpass filter, 16a-1, 16b-1 positioned adjacent to the output surface 14c, in contact therewith in the embodiment of FIG. 2. Radiant energy responsive semiconductors, such as photo transistors, or photodiodes 16a-2, 16b-2 are positioned adjacent to and in contact with the respective filters, 16a-1, 16a-2.

Exemplary commercially available sensor assemblies are offered in the market place by Osram Opto Semiconductors GmbH as the BP 104 FAS and BP 104 FASR photodiode/daylight filter assemblies. Exemplary center frequencies of 850 nm and 950 nm can be used for dual frequency temperature determinations, as discussed above. Other optical assemblies or filters, or center frequencies can be used without departing from the spirit and scope hereof. For example, center frequencies can be further apart, such as at least up to 250 nanometers, without departing from the spirit and scope hereof.

Having a single viewing port, such as port 14b, ensures that the photo-responsive semiconductors 16a-2, 16b-2 are exposed to a common light source. Alternately, two identical light guides could be positioned next to one another and each associated with one of the photo-reactive assemblies.

In yet another alternate, a separate light source, for example, an LED could be positioned next to the one or two light guides. This could be used to verify the integrity of the operation flame detection circuitry of the detector 10. Such a light source could be located adjacent the planar output surface 14c of the light guide 14.

Output signals from the photosensors 16a-2, 16b-2 can be coupled to processing and control circuits 20. Dual channel signal processing circuits 20a, 20b, as discussed above, can carry out a range of digital or analog signal processing.

Flicker detection can be implemented in circuitry 20. Photodiode signals from assemblies 16a, 16b can, in processing circuits 20a, 20b, be amplified with a current-to-voltage converter with a capacitor in parallel with a feedback resistor.

The resistor can be chosen so that this low-pass filter configuration has cut-off frequency in the neighborhood of 20-30 Hz. That signal can be applied to subsequent signal conditioning by AC-coupling via large (e.g. 100 uF) capacitor. Subsequent signal conditioning can include various techniques. For example, and without limitation, rectifying and measuring DC signal levels, or, measuring rms signal levels, or measuring peak-to-peak values over short time intervals (e.g. 1 sec).

Processed signals can be coupled to control circuits 20c where further processing can be implemented to make a fire determination. The control circuits 20c could be implemented, at least in part, with a processor 20-1 which can execute pre-stored control software 20-2. The software 20-2 can be stored in the control circuits 20 in non-volatile storage units for execution by processor 20-1.

Confirmatory signals can be obtained from different types of fire sensors carried by housing 12. These can include smoke sensors, optical, or ionization as well as thermal sensors. Outputs from such sensors, such as 24, 26 can be coupled to control circuits 20c and incorporated into multisensor processing as would be understood by those of skill in the art.

Input/output circuits 20d can also be provided in housing 12 to wirelessly communicate with system S via medium M. Such communications could be also by routed, via cables, through base B if desired.

Additional ambient condition sensors can include smoke sensors, such as 24, gas sensors, thermal sensors, such as 26, humidity sensors, all without limitation. Such sensors can be carried by housing 12 and exposed to ambient conditions in the region R via ambient inflow ports or openings on housing 12.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A detector comprising multiple optical flame sensor assemblies that operate simultaneously comprising:
   a one-piece, elongated, rigid light guide having a hemispherical optical input end where light from a flame directly enters the light guide anywhere over the hemispherical optical input end, a tapered body, and an optical output end,
   wherein the light guide comprises first and second different, optical flame sensor assemblies, each comprised of a distinct optical bandpass filter and a photodiode for dual frequency temperature evaluation of the light from the flame where each sensor assembly responds to an optical, flame related, signal of a respective color frequency of a flame having an orange-yellowish color and light intensity changes at frequencies below 20-30 Hz; and
   control circuits, responsive to at least outputs from the different sensor assemblies, wherein the control circuits form a ratio of signals from the first and second sensor assemblies to detect the presence of flames of a fire.

2. The detector as in claim 1 where the frequencies comprise first and second different frequencies.

3. The detector as in claim 1 where the input end receives input radiant energy over a viewing angle in excess of one hundred seventy degrees.

4. The detector as in claim 1 where the input end is symmetrical about an elongated axis which extends through the output end.

5. The detector as in claim 1 which includes first and second signal processing circuits coupled to respective sensor assemblies and to the control circuits and where the sensor assemblies comprise radiant energy responsive semiconductors.

6. The detector as in claim 1 wherein the first and second optical band pass filters are positioned between the output end and the photodiodes.

7. The detector as in claim 6 where the filters each exhibit a center frequency with the frequencies offset from one another, and where the filters are symmetrically located on each side of an elongated axis which extends through the light guide and through the output end.

8. The detector as in claim 7 which includes at least one added sensor, different from the first and second sensor assemblies.

9. The detector as in claim 8 where the added sensor is selected from a class which includes at least smoke, gas, thermal, and humidity sensors.

10. The detector as in claim 9 which includes a housing that has at least an optical input and ambient condition input ports.

11. The detector as in claim 10 where the control circuits evaluate ambient temperatures indicated by signals from the first and second sensor assemblies.

12. The detector as in claim 1 where the control circuits each include a selected low pass filter.

13. The detector as in claim 10 where the light guide extends between a portion of the housing and the first and second sensor assemblies.

* * * * *